(12) United States Patent
Matthys et al.

(10) Patent No.: US 9,165,301 B2
(45) Date of Patent: Oct. 20, 2015

(54) NETWORK DEVICES FOR REPLACING AN ADVERTISEMENT WITH ANOTHER ADVERTISEMENT

(75) Inventors: Michael Matthys, Los Altos Hills, CA (US); Lebin Cheng, Fremont, CA (US); Aiguo Fei, Foster City, CA (US)

(73) Assignee: CORE AUDIENCE, INC., New York, NY (US)

( * ) Notice: Subject to any disclaimer, the term of this patent is extended or adjusted under 35 U.S.C. 154(b) by 1219 days.

(21) Appl. No.: 11/759,187

(22) Filed: Jun. 6, 2007

(65) Prior Publication Data

US 2008/0306816 A1    Dec. 11, 2008

(51) Int. Cl.
*G06Q 30/02*    (2012.01)

(52) U.S. Cl.
CPC ............ *G06Q 30/02* (2013.01); *G06Q 30/0273* (2013.01); *G06Q 30/0277* (2013.01)

(58) Field of Classification Search
CPC    G06Q 30/02; G06Q 30/0273; G06Q 30/0277
USPC ...................................... 705/14, 14.69, 14.73
See application file for complete search history.

(56) References Cited

U.S. PATENT DOCUMENTS

| | | | |
|---|---|---|---|
| 5,887,133 A * | 3/1999 | Brown et al. ................. | 709/200 |
| 6,405,238 B1 * | 6/2002 | Votipka ........................ | 709/203 |
| 6,421,730 B1 * | 7/2002 | Narad et al. .................. | 709/236 |
| 6,438,125 B1 * | 8/2002 | Brothers ....................... | 370/352 |
| 6,487,538 B1 * | 11/2002 | Gupta et al. ..................... | 705/14 |
| 6,937,598 B1 * | 8/2005 | Hagirahim et al. ........... | 370/356 |
| 7,032,031 B2 | 4/2006 | Jungck et al. | |
| 7,035,911 B2 * | 4/2006 | Lowery et al. ................ | 709/217 |
| 7,058,633 B1 * | 6/2006 | Gnagy et al. .......................... | 1/1 |
| 7,149,772 B1 * | 12/2006 | Kalavade ....................... | 709/203 |
| 7,171,460 B2 * | 1/2007 | Kalavade et al. ............. | 709/223 |
| 7,460,724 B2 * | 12/2008 | Gormish ....................... | 382/240 |
| 7,523,411 B2 * | 4/2009 | Carlin .......................... | 715/782 |
| 7,539,858 B2 * | 5/2009 | Karasawa et al. ............ | 713/153 |
| 7,610,276 B2 * | 10/2009 | Yomtobian .......................... | 1/1 |
| 7,664,017 B2 * | 2/2010 | Sagfors ........................ | 370/230 |
| 7,689,663 B2 * | 3/2010 | Kinnan et al. ................ | 709/217 |
| 7,694,021 B1 * | 4/2010 | Shombert et al. ............ | 709/249 |
| 7,702,814 B2 * | 4/2010 | Lee et al. ...................... | 709/246 |
| 7,765,567 B2 * | 7/2010 | Candelore et al. ............. | 725/32 |

(Continued)

FOREIGN PATENT DOCUMENTS

| | | |
|---|---|---|
| EP | 1241855 | 9/2002 |
| EP | 1755314 | 2/2007 |

(Continued)

OTHER PUBLICATIONS

Keys, Sylvia; STIC search report May 16, 2014; USPTO EIC 3600.*

*Primary Examiner* — John G Weiss
*Assistant Examiner* — Adam Chornesky
(74) *Attorney, Agent, or Firm* — K&L Gates LLP

(57) ABSTRACT

Techniques for replacing an advertisement in a webpage from a website with another advertisement are disclosed. A response including the webpage is intercepted in a network device deployed in an in-line fashion, preferably at a data traffic point along a network. When it is determined that the webpage includes an advertisement that is replaceable, a preferable advertisement more correlated to the interests of a user is embedded in data packets to replace those for the original advertisement. Subsequently, the preferable advertisement is served when the webpage is displayed.

30 Claims, 14 Drawing Sheets

(56) References Cited

U.S. PATENT DOCUMENTS

| | | | |
|---|---|---|---|
| 7,809,785 B2 * | 10/2010 | Appleton et al. | 709/201 |
| 7,823,166 B2 * | 10/2010 | Wu | 719/320 |
| 8,005,717 B2 | 8/2011 | Joo | |
| 8,028,092 B2 * | 9/2011 | Brown et al. | 709/246 |
| 8,370,457 B2 * | 2/2013 | Campbell et al. | 709/219 |
| 8,495,724 B2 * | 7/2013 | Devine et al. | 726/11 |
| 8,707,351 B2 * | 4/2014 | Dharmaji | 725/32 |
| 2002/0009079 A1 * | 1/2002 | Jungck et al. | 370/389 |
| 2002/0010757 A1 | 1/2002 | Granik et al. | |
| 2002/0067730 A1 * | 6/2002 | Hinderks et al. | 370/395.52 |
| 2002/0082923 A1 | 6/2002 | Merriman et al. | |
| 2002/0112061 A1 * | 8/2002 | Shih et al. | 709/229 |
| 2002/0175935 A1 * | 11/2002 | Wang et al. | 345/738 |
| 2002/0184525 A1 * | 12/2002 | Cheng | 713/201 |
| 2003/0033463 A1 * | 2/2003 | Garnett et al. | 710/300 |
| 2003/0115101 A1 * | 6/2003 | Kim | 705/14 |
| 2003/0217162 A1 * | 11/2003 | Fu et al. | 709/229 |
| 2004/0024640 A1 | 2/2004 | Engle et al. | |
| 2004/0068435 A1 * | 4/2004 | Braunzell | 705/14 |
| 2004/0133467 A1 * | 7/2004 | Siler | 705/14 |
| 2004/0169672 A1 * | 9/2004 | Misumi | 345/700 |
| 2004/0189873 A1 * | 9/2004 | Konig et al. | 348/607 |
| 2004/0205171 A1 * | 10/2004 | Nathan et al. | 709/221 |
| 2004/0205221 A1 * | 10/2004 | Yamanaka et al. | 709/231 |
| 2005/0041584 A1 * | 2/2005 | Lau et al. | 370/235 |
| 2005/0223084 A1 * | 10/2005 | Cheng | 709/219 |
| 2006/0165040 A1 * | 7/2006 | Rathod et al. | 370/335 |
| 2006/0168616 A1 | 7/2006 | Candelore et al. | |
| 2006/0179141 A1 * | 8/2006 | John et al. | 709/225 |
| 2006/0282319 A1 * | 12/2006 | Maggio | 705/14 |
| 2007/0005700 A1 * | 1/2007 | Wagner et al. | 709/204 |
| 2007/0136136 A1 | 6/2007 | Nossik | |
| 2007/0143296 A1 * | 6/2007 | Casion | 707/10 |
| 2007/0162590 A1 * | 7/2007 | Campbell et al. | 709/223 |
| 2007/0168465 A1 * | 7/2007 | Toppenberg et al. | 709/218 |
| 2007/0180147 A1 | 8/2007 | Leigh | |
| 2007/0199060 A1 * | 8/2007 | Touboul | 726/11 |
| 2007/0239528 A1 * | 10/2007 | Xie et al. | 705/14 |
| 2007/0266091 A1 | 11/2007 | Lin | |
| 2008/0040225 A1 | 2/2008 | Roker | |
| 2008/0046449 A1 * | 2/2008 | Lee et al. | 707/100 |
| 2008/0072249 A1 * | 3/2008 | Hovnanian et al. | 725/34 |
| 2008/0077478 A1 * | 3/2008 | Kim | 705/10 |
| 2008/0285565 A1 * | 11/2008 | Gunther | 370/394 |
| 2008/0304518 A1 * | 12/2008 | Cheng et al. | 370/474 |
| 2008/0306815 A1 * | 12/2008 | Dykes et al. | 705/14 |
| 2008/0306816 A1 * | 12/2008 | Matthys et al. | 705/14 |

FOREIGN PATENT DOCUMENTS

| | | |
|---|---|---|
| JP | 2002-278865 | 9/2002 |
| JP | 2002-530700 | 9/2002 |
| WO | WO03077167 | 9/2003 |
| WO | WO 2006/081680 | 8/2006 |
| WO | WO2007/123760 A | 11/2007 |

\* cited by examiner

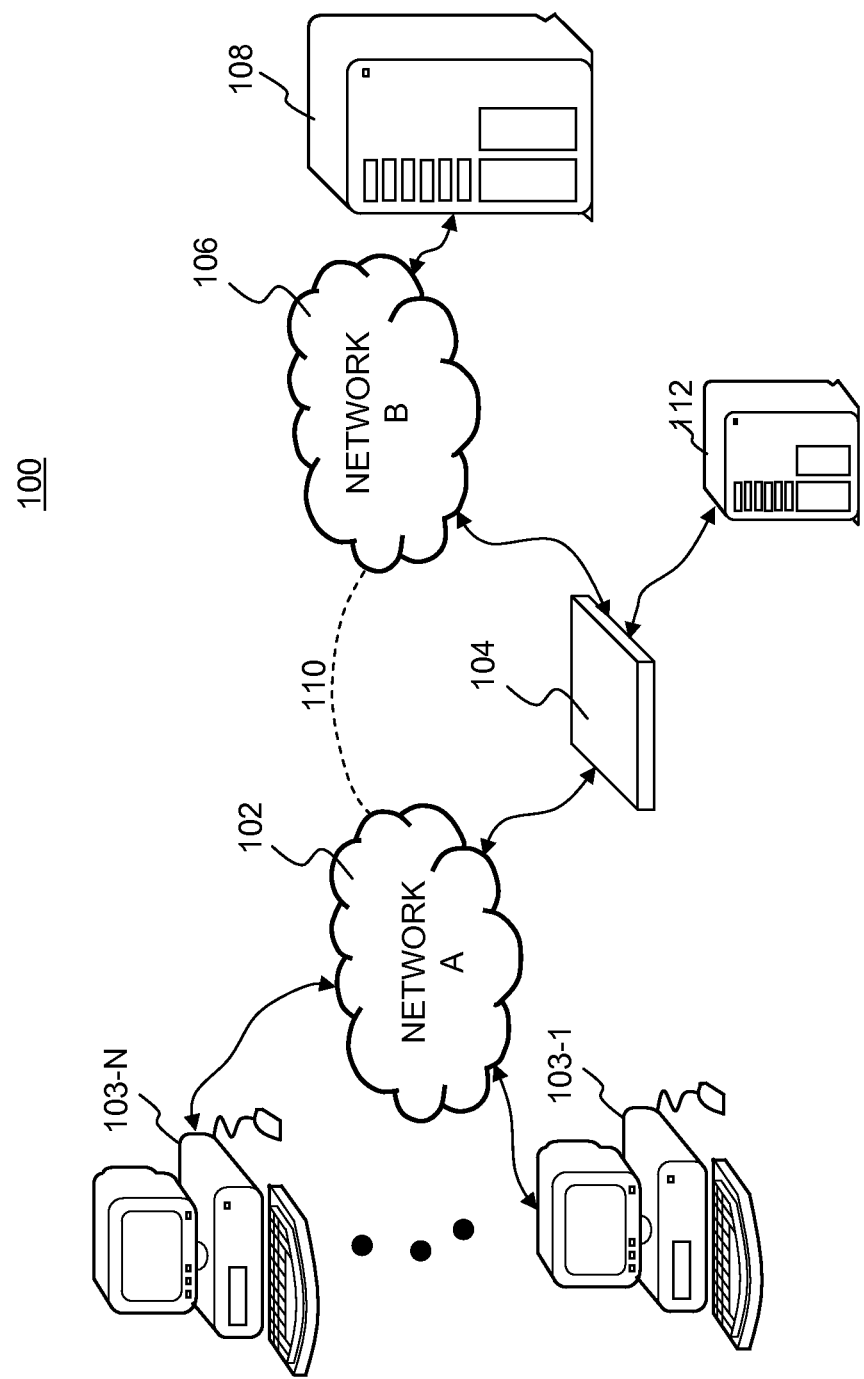

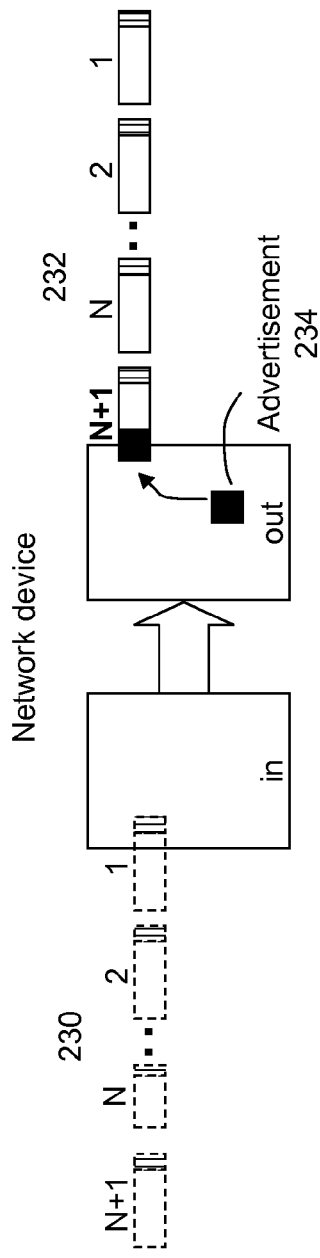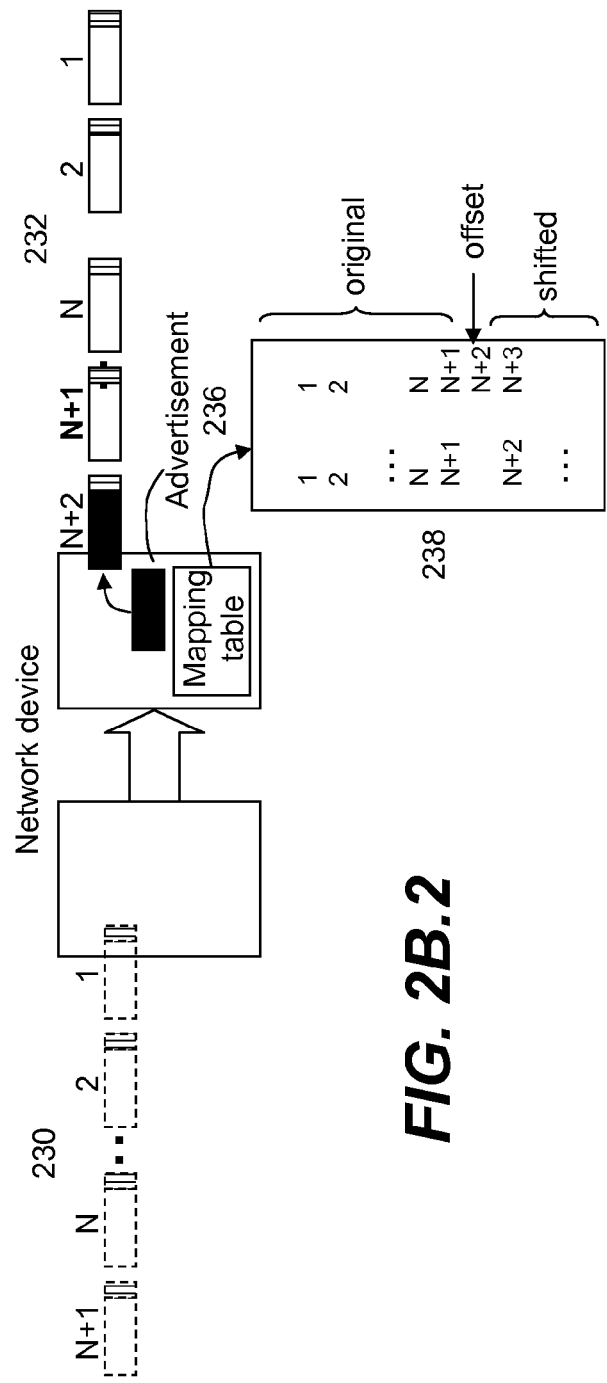

FIG. 2E

FIG. 4B

NETWORK DEVICES FOR REPLACING AN ADVERTISEMENT WITH ANOTHER ADVERTISEMENT

CROSS REFERENCE

This application also relates to U.S. Patent Application entitled "Network Device For Embedding Data In A Data Packet Sequence," application Ser. No. 11/759,179; U.S. Patent Application entitled "Method and System for Inserting Commercial Information in Available Spaces in a Webpage," application Ser. No. 11/759,157; and U.S. Patent Application entitled, "Method And Apparatus For Generating A Default Webpage With Advertisements," application Ser. No. 11/759, 201, all of which are commonly filed on the same day, and which are incorporated by reference in their entirety.

BACKGROUND

1. Technical Field

The present invention is generally related to the area of data communication between a client and a server over the Internet. Particularly, the present invention is related to techniques for replacing one advertisement in a webpage with a selected advertisement. Depending on application, the selected advertisement is more correlated with the interest of a user who has requested the webpage. The replacing processing is achieved transparently with respect to the user and the website.

2. Description of the Related Art

The advertisement industry penetrates every aspect of our life. Traditional advertising channels including newspapers, radio, and television offer variety of products that can be tailored to virtually any market and satisfy companies of any size. However, they can only provide static content and cannot engage potential customers interactively. Rapid growth of the Internet offers the advertisers a unique opportunity to make interactive advertisement campaigns possible by allowing end users to close the loop, namely inducing users to click on an advertisement being served or linking the users to the actual product.

One early form of advertising over the Internet is the "banner ad," which entails embedding an advertisement into a web page. The banner ad is intended to attract traffic to a website of the advertiser. The advertisement is typically constructed from a high-aspect ratio image, often employing colors, animation or sound to maximize its presence in a webpage. These types of advertisements can be positioned somewhere near the primary content in the webpage (e.g., from a newspaper article or a collection of web portal links). The typical banner ad is purchased in bulk by an advertiser from a publisher of the webpage. Often, the content of the advertising bears no relationship to the interests of the viewer, and therefore makes it unlikely that the viewer may attempt to click through to the website of the advertiser. For example, it is very unlikely that male users would click through any banner ads that show cosmetic promotions for females.

There are two dominant techniques in on-line marketing today. The first one is contextual-based; an advertisement being served is chosen based on the browsing context. In other words, an AD being delivered to the end user is based on the content of a web site being visited. For example, users going to a car site such as "Edmund's car buying guide" will most likely be presented with an automotive advertisement displaying a car or related accessories and services. The second one is behavioral based; an advertisement being served is chosen based on the previous browsing history of a user and is not necessarily related to the content of a site currently being viewed.

The famous website www.google.com is one of the examples based on context. For example, when a user enters a search query on the website, the website delivers advertisements based on the search terms in addition to delivering the requested content responding to the search query. In this case, the content provider (i.e., the search engine website) is the intended recipient of the search query from the user, so the content provider is able to provide targeted advertising based on the search query or the results from the relevant search websites. Thus, the content provider possesses the information necessary to make determinations regarding the content and context from the user.

The entities that own the networks, various mechanisms to facilitate the users to access the Internet and various websites are commonly referred to as "service providers". In various ways, these service providers facilitate movement of packetized information in a computer network. Such service providers typically provide value-added services, such as providing "last-mile" hook-up of the network to the home, office, or mobile product, using networks the service providers own or networks owned by other service providers.

From one perspective, service providers possess the first-hand information of all the packets traveling in their networks. By examining information from content being communicated over the networks, a service provider can examine data packets to inspect for computer viruses, thereby enhancing the security of its network. In some cases, a service provider may even be able to obtain the first-hand knowledge how a subscriber browses the Internet for relevant information. However, the service provider is not being fully equipped to provide commercial information that may be of high interest to its subscribers.

Thus there is a great need for a service provider to be able to deliver targeted commercial information that is of interest to its users. As a service provider is in a business to move data from one location to another location, there is another need for techniques that deliver the targeted commercial information without interrupting or altering the data traffic. As the targeted commercial information is tailored to a user or a group of users in responding to their network activities, there is a need for techniques to deliver such targeted commercial information as closely correlated with the interest of the user(s) as possible.

SUMMARY

This section is for the purpose of summarizing some aspects of embodiments of the present invention and to briefly introduce some preferred embodiments. Simplifications or omissions in this section as well as in the title and the abstract of this disclosure may be made to avoid obscuring the purpose of the section, the title and the abstract. Such simplifications or omissions are not intended to limit the scope of the present invention.

Broadly speaking, embodiments of the invention relate to techniques for providing media services over data networks. The techniques described herein are related to each other and each is believed independently novel in the art. The disclosed techniques may be performed alone or in any combination to provide a novel and unobvious system or a portion of a system. It should be understood that the techniques in combination yield an equally independently novel combination as well, even if combined in their broadest sense; i.e. with less than the specific manner in which each of the techniques has been reduced to practice.

Embodiments of the present invention relate to various techniques for providing media services over data networks. According to one aspect of the present invention, some of the techniques, when properly combined, can provide a mechanism to insert or place targeted information into data packets received from a website being visited. The targeted information may be commercial messages (e.g., advertisements) or messages (e.g., various warnings) that must draw attentions from users. According to another aspect of the present invention, an advertisement in a response to a request thereto is located and then replaced with a preferable advertisement, perhaps for a higher fee. The preferable advertisement may be more correlated with the interest of a user. The response is then released to the original destined address. When the response is caused to be displayed, the user sees the preferable advertisement without knowing that the original advertisement has been substituted.

According to still another aspect of the present invention, a location of placing the targeted commercial information is determined, based on a webpage to be viewed, to maximize its presence in a displayed webpage. As a result, when the webpage is displayed on a user screen, the targeted commercial information closely correlated with the interest of the user is displayed together and gets a maximized attention thereto.

According to still another aspect of the present invention, techniques are provided to determine what data packets shall be bypassed, what data packets may be used to carry such targeted commercial information, any additional data packets shall be fabricated to carry such targeted commercial information if needed, all achieved seamlessly without interrupting or altering the original data traffic pattern of the data packets.

According to still another aspect of the present invention, techniques are provided to compose a webpage on the fly when there is an error in receiving a desired webpage. The webpage includes whatever an error message that is supposed to be displayed to a user, but includes a number of advertisements that are closely correlated with the interest of the user. Besides being told an error message (e.g., resulting from a network interruption), the user sees the advertisements and may be tempted instead to click on one of the displayed advertisements. As a result, based on the first-hand knowledge of erred data, a service provider captures an opportunity no other websites could have to deliver targeted commercial information to its subscribers or users without interrupting its services or even changing the original data traffic pattern of all data packets going through its mechanism.

According to still another aspect of the present invention, a server is configured to receive metadata of a request made by a user. The metadata is analyzed to determine the current interest of a user so that an appropriate advertisement may be placed in a response to the request. Depending on implementation, various techniques are employed to deliver the advertisement as close to the interest of the user as possible. In one embodiment, not only are the historic content, context, and/or activities of the user relied upon, time elapsed between a current request and prior similar requests are factored in to determine an appropriate advertisement.

According to yet another aspect of the present invention, a business entity designs a network device to be leased to a service provider. The network device is configured to examine all traffics and make modifications to some data packets when deeming appropriate. Such a network device is deployed by the service provider at a location in a network that has possibly the highest data traffic. The network device operates transparently to the users as well as to the websites being visited, and is configured to maximize opportunities of placing commercial information for the service provider. By logging the advertisement opportunities or results of interacting with any placed commercial information, the business entity has created an opportunity to generate revenues from serving targeted advertisements to the subscribers or users of the service provider using the first-hand information of all the data packets traveling in the networks of the service provider. With a predefined arrangement, the revenues may be shared between the business entity and the service provider, or with other parties that provide the advertisements.

Embodiments of the invention may be implemented in numerous ways, including a method, system, device, or a computer readable medium. Several embodiments of the invention are discussed below. In one embodiment, the invention provides a method for a method for placing an advertisement in a webpage, the method comprises: intercepting in a device a response being requested by a user, wherein the device is deployed at a location in a network; determining whether the intercepted response has a space for advertisement; selecting an advertisement for the space, when the intercepted response is determined to be a webpage and have the space for advertising, in accordance with selected criteria so that the advertisement is of interest to the user; modifying data packets representing the webpage to include the advertisement; and releasing the modified data packets to the user, wherein the advertisement is presented to the user when the webpage is displayed.

In another embodiment, the invention provides a method for placing an advertisement in a default webpage, the method comprises: intercepting a response in a device to a request from a client machine associated with a user, wherein the device is deployed at a location in a network; selecting an advertisement, when the intercepted response is determined to have an error message, in accordance with selected criteria so that the advertisement is of interest to the user; generating data packets representing the default webpage to include the advertisement; and releasing the data packets to the client machine, wherein the advertisement is presented to the user when the default webpage is displayed.

In yet another embodiment, the invention provides a method for replacing a first advertisement with a second advertisement in a default webpage, wherein the second advertisement is deemed to be more correlated with the interest of a user. The method comprises: intercepting a response in a device to a request from a client machine associated with the user, wherein the device is deployed at a location in a network; determining a presence of the first advertisement and further whether the first advertisement is replaceable; deciding the second advertisement in conjunction with criteria when the first advertisement is determined replaceable; reformatting the second advertisement to fit a size of an area in the webpage occupied by the first advertisement; modifying a data packet that represents the first advertisement to include the second advertisement; and releasing the data packet to the client machine, wherein the second advertisement is presented to the user when the response representing a webpage is displayed.

There are numerous objects, features, and advantages in the present invention. These objects, features, and advantages will become apparent upon examining the following detailed description of various embodiments thereof, taken in conjunction with the attached drawings.

BRIEF DESCRIPTION OF THE DRAWINGS

The invention will be readily understood by the following detailed description in conjunction with the accompanying drawings, wherein like reference numerals designate like structural elements, and in which:

FIG. 1 shows an exemplary configuration in which the present invention may be practiced, it includes a network device deployed in an inline fashion;

FIG. 2B.1 illustrates a situation in which one or more data packets identified to include data representing an advertisement;

FIG. 2B.2 illustrates that a new packet is fabricated by a packet manager to carry an advertisement;

FIG. 2E shows a portion of the webpage from www.marketwatch.com that includes a number of spaces that may be used for placing an advertisement therein;

FIG. 4B shows that the webpage of FIG. 2D has been placed at least three targeted advertisements, where two of the advertisements are placed directly in the webpage while a third advertisement is placed in the expanded space as a result of a different display ratio;

DETAILED DESCRIPTION OF THE INVENTION

Figure 2A:
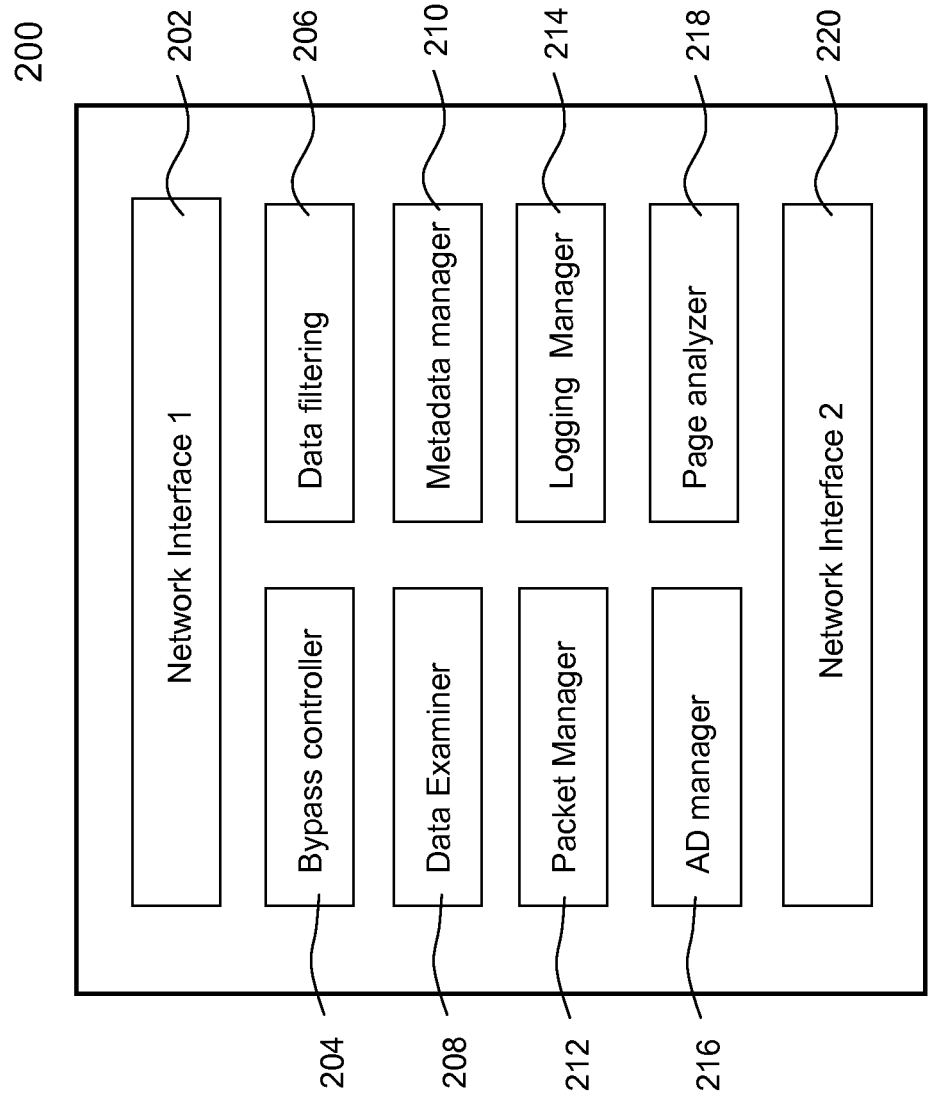
FIG. 2A shows a functional block diagram of a device which may correspond to the network device of FIG. 1.

In the following description, numerous specific details are set forth to provide a thorough understanding of the present invention. The present invention may be practiced without these specific details. The description and representation herein are the means used by those experienced or skilled in the art to effectively convey the substance of their work to others skilled in the art. In other instances, well-known methods, procedures, components, and circuitry have not been described in detail since they are already well understood and to avoid unnecessarily obscuring aspects of the present invention.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments mutually exclusive of other embodiments. Further, the order of blocks in process, flowcharts or functional diagrams representing one or more embodiments do not inherently indicate any particular order nor imply limitations in the invention.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

For convenience, definitions for some terms are provided below. It should be noted that the definitions are to facilitate the understanding and description of the present invention according to one embodiment. The definitions may appear to include limitations with respect to the embodiment. However, the actual meaning of the terms may have applicability beyond such embodiment.

Client machine, local device, computer, or simply device—used interchangeably herein, is a computing device typically used by a user to access a website via a network (i.e., wired and/or wireless). Examples of such a machine include a desktop computer, a laptop, a PDA, and a handheld device with Internet access.

Content-extractor-inserter (Certer)—a hardware appliance, also referred to as "network device" or "device", deployed at a traffic concentration point on a network to capture or intercept requests from the users and responses to the requests to determine appropriate information that may be used to identify commercial data (e.g., advertisements) interesting to the users, and place such data in selected responses.

Server, server device, server computer, or server machine—used interchangeably herein, is a computing device, typically located remotely from the client machines. Depending on implementation, a server herein may mean a stand-alone computer, a part of the network device, or a cluster of two or more computers configured to deliver the server operations described herein. When executing one or more modules implementing one embodiment of the present invention, the server is configured to deliver features, advantages or objects disclosed in the presented invention.

Publisher—an owner of a website that makes its website accessible by users and delivers contents to the users in responding to requests therefrom, for example, Microsoft Corporation is a publisher of www.msn.com.

Embodiments of the present invention are discussed herein with reference to FIGS. 1-5. However, those skilled in the art will readily appreciate that the detailed description given herein with respect to these figures is for explanatory purposes only as the invention extends beyond these limited embodiments.

Referring now to the drawings, in which like numerals refer to like parts throughout the several views. FIG. 1 shows an exemplary configuration 100 in which the present invention may be practiced. The network 102 may be a local area network (wired and/or wireless). The client machines 103-1 . . . 103-N are representation of users that rely on the network 102 (e.g., a local area network) to access the network 106 (e.g., the Internet). In one embodiment, the network 102 is operated by a service provider. All users associated with the client machines 104 are subscribers of the service provider.

Instead of allowing a direct communication link 110 between the network 102 and the network 106, a network device 104 is provided to couple the network 102 to the network 106. As a result, all data traffics have to go through the network device 104. According to one aspect of the present invention, the network device 104 is deployed there without interrupting or altering any data traffic patterns but providing business opportunities to the service provider to serve targeted commercial information to its users. In other words, the operation of the network device 104 is transparent to the users and all websites being visited.

In operation, whenever a client machine (e.g., 103-1) sends a request to visit a website (e.g., www.ebay.com), the request and the response thereto, alone or in combination, or data packets representing the request and the response are intercepted by the network device 104 and analyzed together with a dedicated device. Depending on implementation, the dedicated device may be part of the network device 104 or a separate server machine. In the following description, the machine is described as a server 112 and configured to determine one or more appropriate advertisements that may be of high interest to the user. The advertisement is then placed in the response. When the response is eventually displayed on the client machine, there is a high likelihood that the user may be temped to interact with the advertisement and brought up to a commercial website promoting a product or a service by the advertiser.

The network device 104 is communicating with the server 112 and to provide intercepted information or metadata thereof (collectively "metadata") to the server 112 that is configured to record or update the browsing behaviors of users, and/or analyze the metadata from the network device 104 to determine appropriate advertisements in view of the content and/or context of the metadata, and/or in conjunction with the browsing behaviors. One of the important features, advantages and objects of the present invention is to provide commercial information that may be of high interest to the users.

Referring now to FIG. 2A, there shows a functional block diagram of a device 200, which may correspond to the network device 104 of FIG. 1. The device 200 includes two network interfaces 202 and 220, a bypass controller 204, a data filtering 206, a data examiner 208, a page analyzer 210, a packet manager 212, a logging manager 214, an AD manager 216, and a Page analyzer 218. Depending on implementation, the device 200 may be deployed in a residential complex, a business complex or at a point on the network that most or all of data traffics come through. According to one embodiment, the device 200 is deployed by a service provider that provides various mechanisms to facilitate its users to access the Internet. One of the important features, objects and advantages in the present invention is that the deployment of the device 200 on a data network is invisible to the users and the websites they visit.

From the perspective of a website being visited, a publisher of the website sometimes prefers to know who is visiting its website (e.g., from which IP address the website is being visited), thus making the operation of the device 200 invisible becomes very important to a service provider. As will be further detailed below, the original traffic patterns of all data packets are not altered, wherein a traffic pattern of a data packet is defined to be metadata of the data packet and typically includes in what is commonly referred to as a header. In generally, a header of a data packet is placed at the beginning of a block of data being stored or transmitted and contains information for the handling of the data block (e.g., source and destination information). In one embodiment, the headers of data packets going to or coming back from a website remain nearly intact even the data packets going through the device 200 in which some of the data packets are modified to include one or more advertisements (thus the sequence numbers of subsequent data packets may be modified). From the network perspective, the device 200 is inserted in an inline fashion at a traffic point on a network.

The network interface 202 is provided to facilitate data communication between the device 200 and one or more client machines that are to interact with the Internet. The network interface 220 is provided to facilitate data communication between the device 200 and a server. The server is configured to execute one embodiment of the present invention to analyze the content and/or context of a request and a response thereto, record and update a browsing behavior of a particular user, and eventually determine an appropriate advertisement for the user. Depending on implementation and actual environment, the network interface 202 or 220 may be implemented in accordance with a protocol (e.g., TCP). In operation, the data packets inbound or outbound go through the network interface 202, metadata about some of the data packets is captured and transported to the server via the network interface 220.

The bypass controller 204 is provided to allow data packets to bypass the device 200 in a predefined event. Depending on implementation, the bypass controller may be controlled automatically or manually, and locally or remotely. For example, in an event that the device 200 is being updated or in default, the bypass controller 204 is commanded to allow the data packets to bypass the device 200 as if it is not there.

The data filtering 206 is provided to filter out those data packets that are not meant for examination in the device 200. In one embodiment, the data filtering 206 is configured to examine data packets to determine the characteristics of the data packets. If the characteristics of data packets does not fall into a pre-defined category, the data packets are routed out of the device 200 without further analysis. For example, an exemplary category is defined to exclude data packets carrying audio data ("audio packets") or instant messages ("IM packets"). Thus, when data packets are received or intercepted in the device 200, the data packets are examined to determine whether they are audio packets or IM packets. If they are the audio or IM packets, the data packets are routed out of the device 200 to continue to their intended destination. If the data packets are other than the audio or IM packets, the data packets are routed to the data examiner 208 to determine whether there is an advertisement opportunity.

Accordingly the data examiner 208 is provided to examine the payloads of the data packets to determine whether there is an advertisement placement opportunity. Some publishers do not allow their contents to be altered thus data packets from websites of these publishers are not allowed to place an advertisement. Whenever there is an indication that data packets from a website disallowing any modification to its data packets, the received packets are bypassed by the data examiner 208. In one embodiment, there is a black list of publishers. Any packets from the websites of these publishers are bypassed. In another embodiment, the characteristics of the webpages are examined as there are certain pages that could not be placed any additional data. For example, a webpage itself is an advertisement. There are also webpages that are in fact applications such as Yahoo!Mail. Likewise whenever it is determined that the received data packets are applicable for placing an advertisement therein, such data packets are routed to the metadata manager 210. Depending on implementation, there are different ways to examine data packets to determine whether they are applicable for placing advertisements therein. In one embodiment, there is an arrangement between a service provider and a publisher. The service provider is allowed to insert targeted advertisements in webpages from the publisher, presumably revenues generated from such advertisements are shared between the service provider and the publisher. Thus whenever a webpage is received, the data examiner 208 may be configured to determine whether it is from such a publisher. If it is indeed from the publisher, the data packets are deemed to be applicable for advertisement opportunity. In another embodiment, as will be further described below, the data examiner 208 is configured to deem data packets representing an error message to be applicable for advertisement opportunity. Such an error message may result from a downtime of a website or a network being visited.

The metadata manager 210 is provided to capture the essence of the received data packets inbound or outbound. In one embodiment, when a request to access a website from a user is received in the metadata manager 210, the address of the website is extracted and sent to a dedicated server. For example, when a user desires to visit www.cars.com, either the whole address or a portion of the address "cars" is sent to the server. The server may determine that an advertisement of cars is appropriate to be placed in a response to the request, assuming that the response permits such a placement of the advertisement. When the user further browses the site and selects a particular make "Lexus", the metadata of the address www.cars.com/lexus (e.g., cars/lexus) may be sent to the server that later selects an advertisement of a Lexus model to be placed in a response to the request. In another embodiment, when a response from a website to a request is received in the metadata manager 210, the metadata of the response is captured to determine an appropriate advertisement to be included in the response. For example, metadata of a response from www.cars.com may prompt the server to place a general car advertisement in the response. When a webpage of the response is displayed, the advertisement is also displayed.

The packet manager 212 is designed to modify those data packets that are to be modified to include an advertisement selected for the user. It is assumed that an advertisement has been selected to place in a webpage, the packet manager 212 is configured to add some data to the data packets representing the webpage. Depending on the location of the advertisement in the webpage and the length of the payload of a data packet representing the portion of the webpage, the payload of the data packet may be expanded to include the data representing the advertisement. FIG. 2B.1 illustrates a situation in which one or more data packets identified to include data representing an advertisement. A response to a request is a webpage represented by a sequence of N+1 data packets. Each of the data packets is uniquely identified by an identifier that is herein referred to as a sequence number. Depending on implementation, a sequence number may be byte-based or packet-based. To facilitate the description of the present invention, packet-based sequence numbers are assumed in the following description.

It is assumed that an N-th packet is the one that needs to be modified to include the advertisement 234. As the N+1 data packets pass through the network device 200, the packet manager 212 is configured to intercept the N-th packet and expand the payload thereof to include the advertisement 234. If the N-th packet, after being added the advertisement 234, exceeds a predefined length, a next packet may be used to include the remaining of the advertisement 234.

There is a situation, however, in which the next packet is not available (e.g., the next packet has fully used its length limit, or the N-th packet is the last one). FIG. 2B.2 illustrates that a new packet is fabricated by the packet manager 212 to carry an advertisement 236. As N+1 data packets have passed through the network device 200, the packet manager 212 adds a new data packet N+2 to the sequence. Thus, the data packet N+2 carries the advertisement 236 and becomes part of the sequence. In one embodiment, the header of the new packet N+2 includes substantially the same information (e.g., a source address and a destination address) of other headers of the packets in the sequence. In one perspective, the newly added packet appears to be from the website. However, the newly added packet in fact breaks up the integrity of the data packets originally from the website because the sequence numbers of the data packets after the newly added packet are going to be off. To compensate the integrity of the original packet sequence, a mapping table 238 is used to map the original packets to "new" packets. In other words, the sequence numbers of the data packets before the occurrence of the newly added packet remains unchanged, the sequence numbers of the data packets after the occurrence of the newly added packet are mapped to new sequence numbers. In this particular example, as the packet N+2 is newly added and the packet offset is 1, a packet coming after the packet N+1 in the original sequence becomes a packet N+3. If the packet offset is m, a packet coming after the packet N+1 in the original sequence becomes a packet N+m in a new sequence. It should be noted that the packet offset remains valid in an entire session (e.g., an HTTP session) regardless a user has left one webpage and moved to another page. Further, the packet offset can be accumulated as more advertisements are placed in the session.

In one embodiment based on TCP/IP protocol, for every data packet that has arrived its destination or been received, an acknowledgement is sent to or reported to its original source (e.g., a server sponsoring a website). Whenever an acknowledgement from the destination regarding a new data packet is intercepted by the device 200, the acknowledgement is blocked or dropped from being further transported or reported to the source so that the source would not be confused with the inserted data packet. As a result, subsequent acknowledgements to the original data packets from the source are modified to recover the original sequence numbers of the data packets from the website.

Figure 2C:
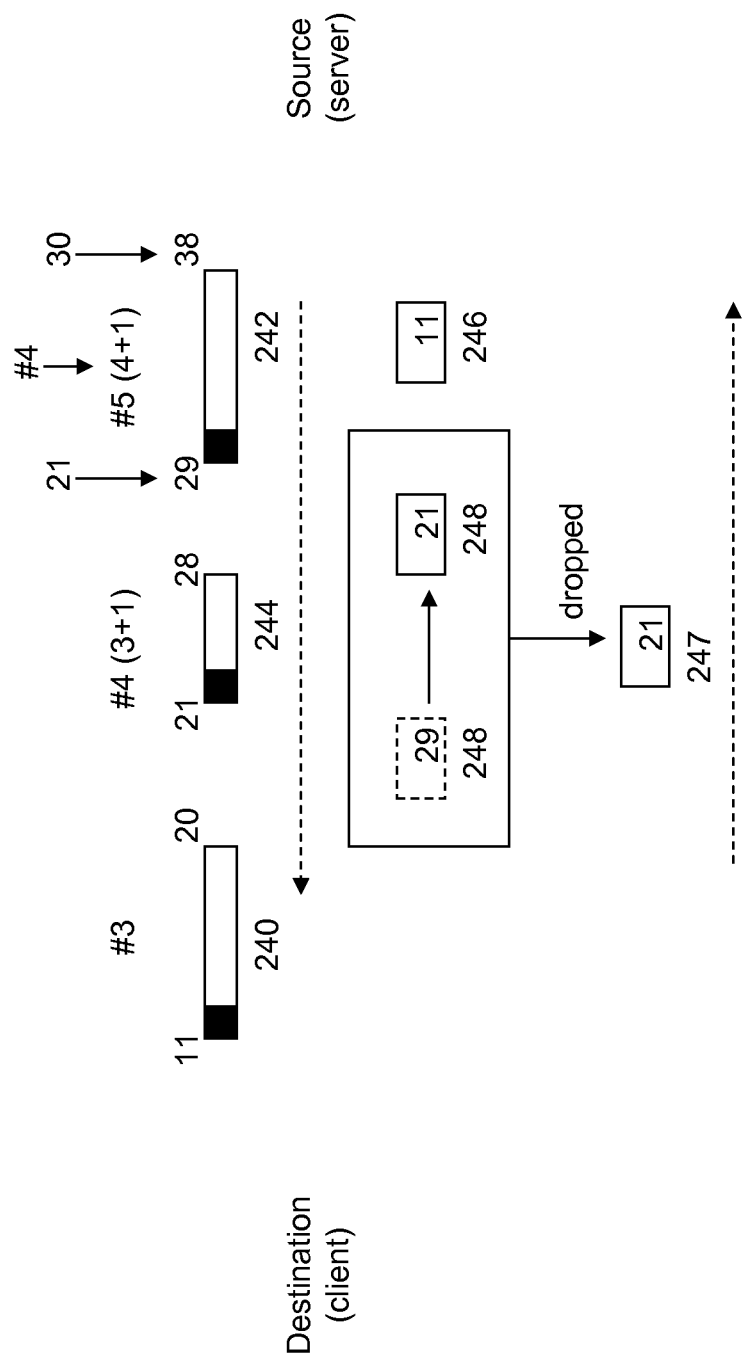
FIG. 2C illustrates an insertion of a data packet and removal of a corresponding acknowledgement.

FIG. 2C illustrates an insertion of a data packet and removal of a corresponding acknowledgement. It is assumed that there are two data packets 240 and 242 in a packet sequence from a server. Each of the two data packets 240 and 242 has a data length of 10. Thus byte-based sequence numbers of the two data packets 240 and 242 are respectively 11 and 21. When the packet sequence is intercepted in the device 200, it is determined that a new data packet 244 has to be fabricated and inserted right after the data packet 240. As a result, byte-based sequence numbers for the three data packets are 11, 21 and 29, respectively, where the sequence number of the packet 244 has been modified. After having receiving the data packets, the client device responds with a sequence of acknowledgements 246-248. Because the acknowledgement 247 is a result of the inserted data packet, it has to be dropped. At the same time, the acknowledgement 248 is not corresponding to the original data packet 242 (the sequence of which has been modified from 21 to 29). In one embodiment, the device 200 is configured to modify the acknowledgement 248 by modifying the sequence number from 29 back to 21.

Figure 2D:
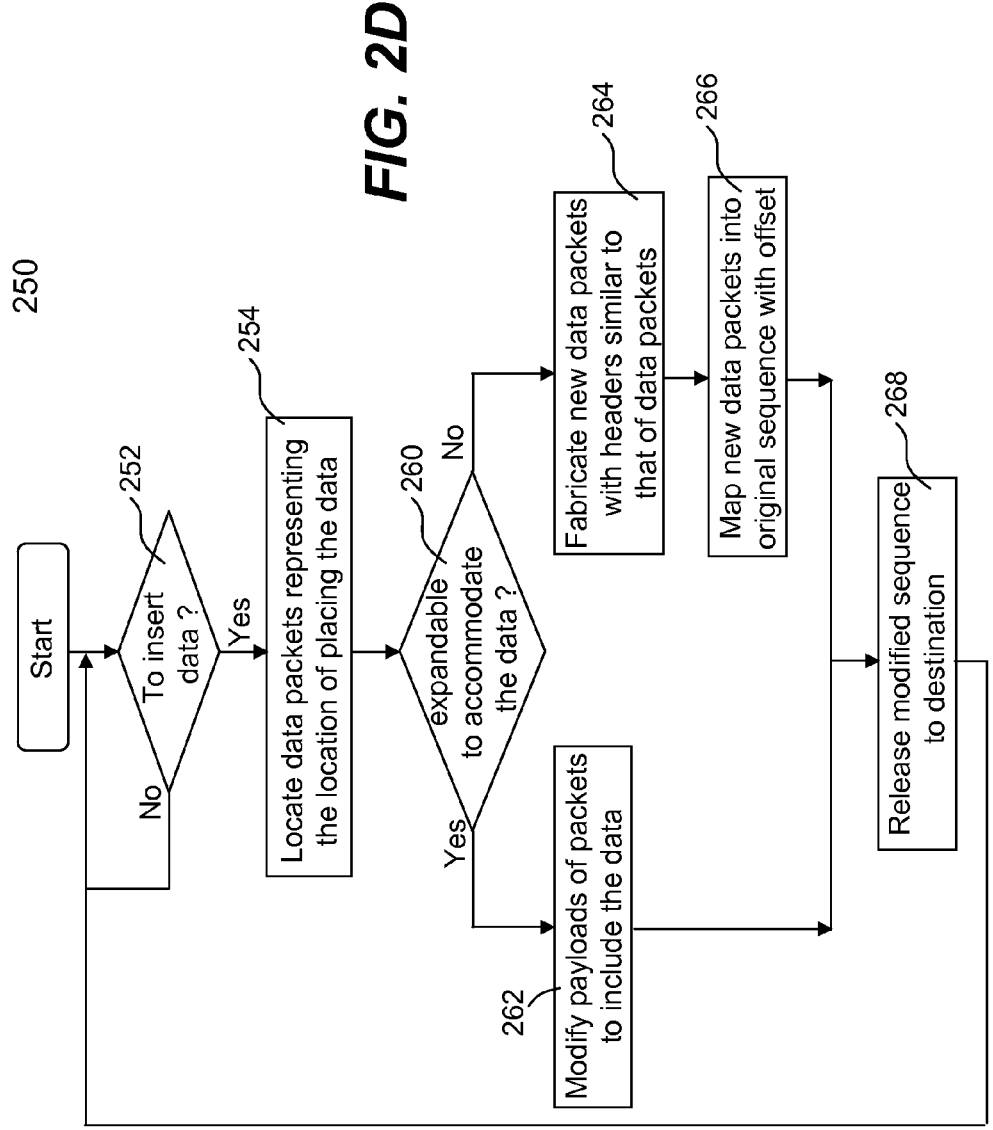
FIG. 2D shows a flowchart or process of placing selected data into a sequence of data packets, where the selected data may represent one or more advertisements or notifications that must draw attentions from one or more users.

FIG. 2D shows a flowchart or process 250 of placing selected data into a sequence of data packets, where the selected data may represent one or more advertisements or notifications that must draw attentions from one or more users. At 252, the process 250 determines whether there is data to be inserted into a response intercepted from a website being visited. It is assumed that the data represents an advertisement or a script including a link to the advertisement. If there is no need to insert any advertisements (e.g., perhaps a webpage can not be placed any advertisements therein), the process 250 goes back to wait for the decision at 252.

It is assumed now that a decision from 252 is to insert data in a response from a website. The process 250 now moves to 254 where data packets from the website are examined as they arrive to locate the packet or packets representing a particular location in the webpage where an advertisement is going to be placed. As illustrated in FIG. 2B.2, the data packets are coming and numbered in a sequence. It is assumed that a particular data packet representing the location in the webpage is located. At 260, the data packet is determined whether it is expandable to accommodate the advertisement (or a script). It the payload of that data packet is not fully used, the process 250 goes from 260 to 262 where the data packet is modified to include the data. In one embodiment, a script containing a link to the advertisement is added in the payload of the data packet without modifying the header thereof. The modified data packet is then released to its original destined client machine at 268.

Back at 260 where the data packet is determined whether it is expandable to accommodate the advertisement (or a script), it is now assumed that the payload of that data packet is fully used. The process 250 has to go from 260 to 264. As described above, one or more new data packets need to be fabricated. At 264, in one embodiment, the header of the data packet in the original sequence is copied and its sequence number is noted, for example, N-th packet. A new data packet carries substantially the same header as the N-th packet but is sequenced as a data packet N+1 in a new sequence. The payload of the data packet N+1 is used to carry one or more advertisements or scripts. An offset between the new sequence and the original sequence is now set to be one. If there is a need to fabricate more new data packets to carry the advertisements or scribes, the offset is set accordingly. As a result, subsequent data packets to the N-th packet in the original sequence are now shifted by the offset at 266. Because of the way the new data packet is fabricated, the new data packet appears to be from the website being visited. At 268, the newly fabricated data packet is released together with the original data packets to their original destined client machine.

Referring back to FIG. 2A, the logging manager 214 is provided to record any access to or interactions with a placed advertisement. In one embodiment, the logging manager 214 provides an evidence of how effective an advertisement may be so that the order of placing advertisements in a same category may be adjusted or the advertisements are priced differently. In another embodiment, the logging manager 214 may be accessed by a business entity that owns the network device 200 to determine how to share revenues with a service provider as a result of interactions with the placed advertisements by the user. In still another embodiment, the logging manager 214 is used to provide a basis for auctioning a placement of an advertisement among advertisers.

The AD manager 216 is provided to place an advertisement in a webpage requested by a user. In one embodiment, a script including a link is added to a webpage represented in HTML. When the webpage is displayed on a display device, the script is executed to retrieve the advertisement from a repository or database. As a result, the user sees a display of the requested webpage embedded with the advertisement.

Figure 2E:
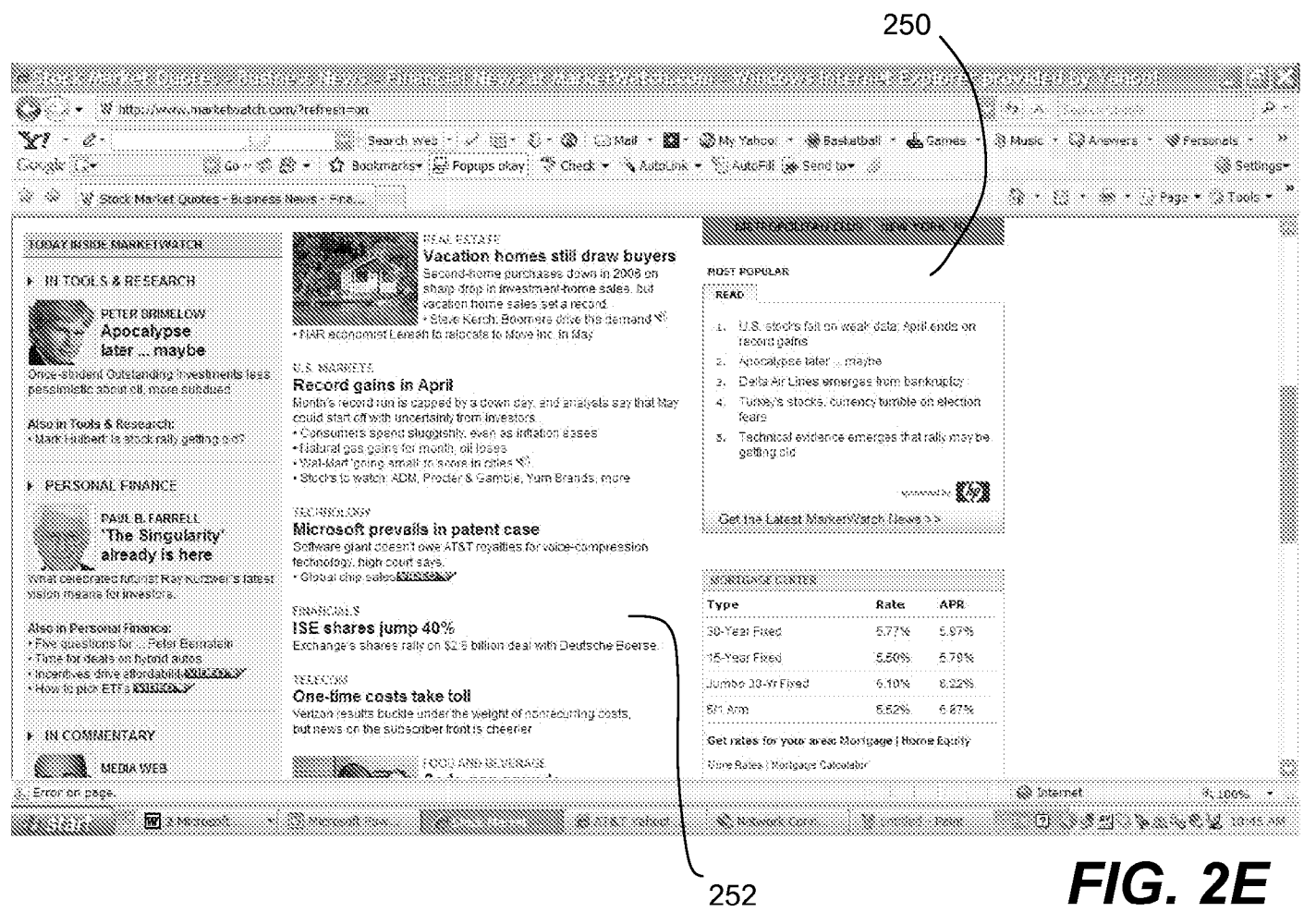

The page analyzer 218 is provided to analyze a webpage to determine whether there is an available space in the webpage that may be utilized to include an advertisement. FIG. 2E shows a portion of the webpage from www.marketwatch.com that includes a number of spaces (e.g., referenced by 250 and 252, respectively) that may be used for placing an advertisement therein. In one embodiment, the page analyzer 218 is configured to directly analyze the HTML data of the webpage to determine an available space that is suitable for placing an advertisement therein. In another embodiment, a script is added to a received webpage. The script is configured, when executed, to look for an available space per some criteria. Depending one implementation, the criteria may be a particular size or location of a space that may be considered as applicable for placing an advertisement therein. In some cases, two or more adjacent spaces may be detected, a merger of these spaces may result in a space applicable for an advertisement. In still another embodiment, In still another embodiment, the page analyzer 218 is a completely "off-line" module in a sense that it is configured to work with or acts as a web crawler, visiting various webpages, rendering them, and determining any available or suitable spaces for possible advertisements. The resulting space information may be stored in a database indexed by the corresponding URI. Such a database can be used by the AD manager 216 or an advertisement serving engine in the server to determine the optimal location of an advertisement when the advertisement is being served in a webpage. In any case, the location and size of a space is reported to the page analyzer 218 that in return reports to the server to determine an appropriate advertisement to fit into the detected space. Optionally, the AD manager 216 is configured to work with a database of webpages collected by a web crawling or spidering process, in which case, the AD manager 216 knows exactly where in a webpage an advertisement may be placed.

It should be noted that FIG. 2A shows only those essential functional blocks that may be combined to realize one or more features, advantages or objects of the present invention, and should not be considered to have precluded the presence or addition of elements, components, functional blocks and/or groups (e.g., memory, a CPU, and a data bus). Those skilled in the art may also appreciate that not all of the functional blocks must be present to practice the present invention.

It can be appreciated that the device 200 of FIG. 2A operates completely transparently to a client device and a server device. In operation, a conventional proxy server terminates client connections before opening new connections to fetch information from servers while the device 200 is not engaged to terminate client connections. From the perspective of a publisher, with a traditional proxy server, requests for contents come from the proxy server, not the client. The presence of the proxy server effectively masks the identity of end user clients. In addition, not all applications can be made to interoperate with a proxy server in the middle. Certain applications, such as security applications and/or real-time applications, would stop working either because the end points must know the network identities of each other or the proxy server simply introduces too much delay. Further, the data filtering 206 or the data examiner 208 provides an inherent mechanism to bypass those data packets (e.g., video or audio) while a traditional proxy server lacks such a mechanism and has to deal with all trespassing data packets, thus lacking scalability. Accordingly, the device 200 in the present invention provides much improved handling of data packets with an increased level of transparency.

Figure 3:
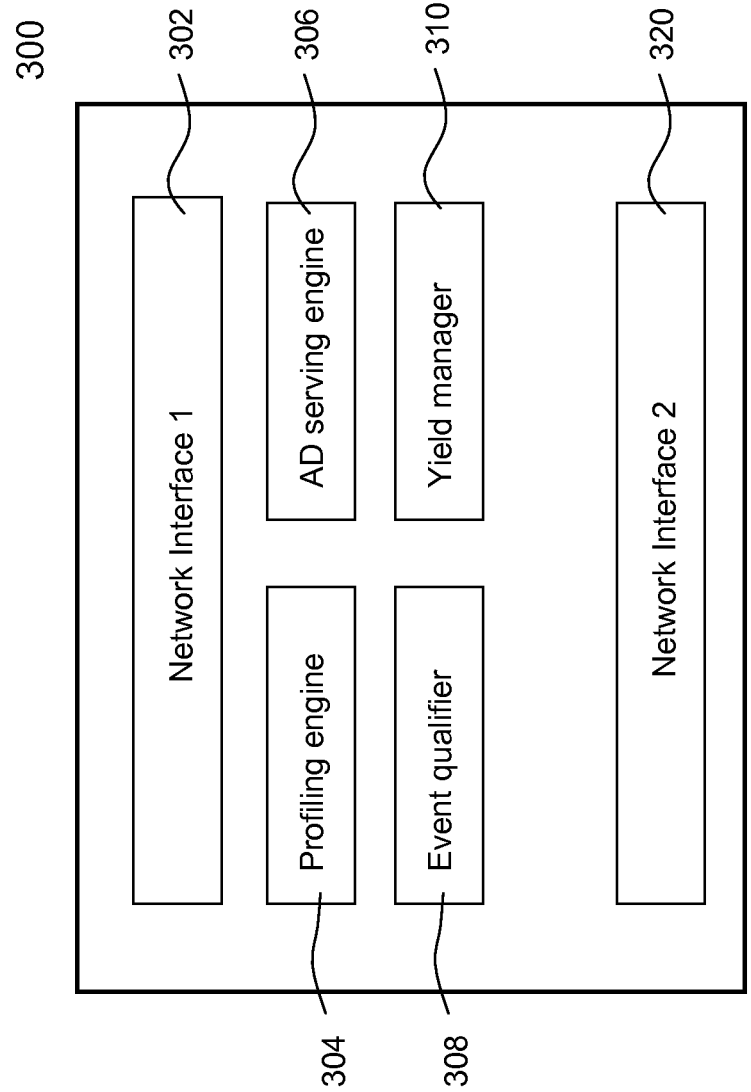
FIG. 3 shows a functional block diagram of a server communicating with the device of FIG. 2A to facilitate the placement of an appropriate advertisement in a response to a request from a user.

For completeness, FIG. 3 shows a functional block diagram of a server 300 communicating with the device 200 of FIG. 2A to facilitate the placement of an appropriate advertisement in a response to a request from a user. It should be noted that the server used herein is a relative term with respect to the network device 200 of FIG. 2A. As stated above, there is no clear distinction as to which functional blocks must be in the network device 200 and which functional blocks must be in the server 300. Depending on implementation, some of the functional blocks as shown in the network device 200 of FIG. 2A may be implemented in the server 300 while some of the functional blocks as shown in the server 300 may be implemented in the network device 200. Alternatively, all functional blocks may be implemented in the network device 200 or in a distributed manner. A shown in FIG. 3, the server 200, in one embodiment, is configured to analyze raw information (e.g., metadata) from the network device 200 about a user and transform it into a user behavioral profile, and utilize a user profile together with advertiser and publisher business rules to select the most relevant advertisements for a user.

As shown in FIG. 3, the server 200 includes two network interfaces 302 and 320, a profiling engine 304, an AD serving engine 306, an event qualifier 308, and a yield manager 310. Not shown specifically, the server 300 may include or be coupled to a database that houses advertisements from advertisers. The network interface 302 is provided to facilitate data communication between the server 300 and the network device 200. The network interface 320 is provided to facilitate data communication between the server 300 and another device. In one embodiment, another device is one of the client machines 103-1 ... 103-N and is caused to fetch one or more advertisements from the server 300 via the network interface 320 for display in a webpage. In another embodiment, the server is updated or provided with new features, and communicates with other devices via the network interface 320. Depending on implementation and actual environment, the network interface 302 or 320 may be implemented in accordance with a communication protocol (e.g., TCP/IP).

The profiling engine 304 is configured to record, update and analyze a profile of a user. In operation, metadata is transported from the network device 200 of FIG. 2A. From the metadata, the profiling engine 304 transforms clickstream data and subsequent transformation of that data into a meaningful behavioral profile for a user. In one embodiment, a behavioral profile comprises a user's unique demographics, geographic location, lifestyle, as well as quantified expressions of purchase intent for various products or services. Once the behavioral user profile is constructed, it is continuously updated and enhanced as user click-stream data becomes available. One of the important features of the profiling engine 304 is to keep all behavioral profiles unique, more importantly, anonymous. In other words, all personally identifiable information is filtered out from the captured user click-stream data.

The AD serving engine 306 is designed to interface with a database of advertisements and various constraints therefor. Upon receiving an indication extracted from a behavioral profile or content and context of a request and a response thereto, the AD serving engine 306 selects from the database one or more advertisements to be placed in the response via the network device 200 so that the advertisements are shown when the response is displayed. In one embodiment, a separate module (not shown) or AD serving engine 306 is configured to reformat a selected advertisement to fit nicely in a located available space in a webpage.

The event qualifier 308 is provided to qualify the metadata received from the network device 200. According to one embodiment, the event qualifier 308 defines a finite number of categories, each related to one type of interest. Given received metadata, the event qualifier 308 determines which category may correspond to a subject in the metadata. If no category can be fit, a new category is created. Through a separate module (not shown), received metadata usually goes through an initial process to ensure that a subject may be extracted from the metadata. If the metadata received from the network device can not be classified, the data examiner may be instructed to bypass the corresponding data packets or the categories are updated. In one embodiment, the event qualifier 308 contains a portfolio of several qualifier types such as: page text or URL-based, search-based, $3^{rd}$ party ad-clicked based, etc. Each qualifier type attempts to identify a user's current interest category based on the occurrence of a specific user action: requesting a page, submitting a keyword search, clicking on a $3^{rd}$ party ad, etc. To facilitate the determination of a category, the portfolio may be structured as a tree structure, where each of the leaves of the tree structure is a respective category.

The yield manager 310 utilizes a user profile in conjunction with advertiser and publisher business rules (e.g., targeting constraints) to select the most relevant advertisements for a user. For each call that the yield manager 310 receives from the AD serving engine 306, the yield manager 310 first considers all available advertising campaigns active in an advertisement database or system and eliminates those that do not meet the targeting constraints. For the remaining advertising campaigns, the yield manager 310 calculates a predicted response from the user to the campaign advertisement (likelihood of a click or conversion) based on the profile of the user. Based on the predicted response and the campaign rates, the yield manager 310 calculates a projected revenue for each of the campaigns that could be generated from this call. Finally, the yield manager 310 selects the campaign with the highest projected revenue and passes the winning advertisement identifier to the AD serving engine 306.

Figure 4A:
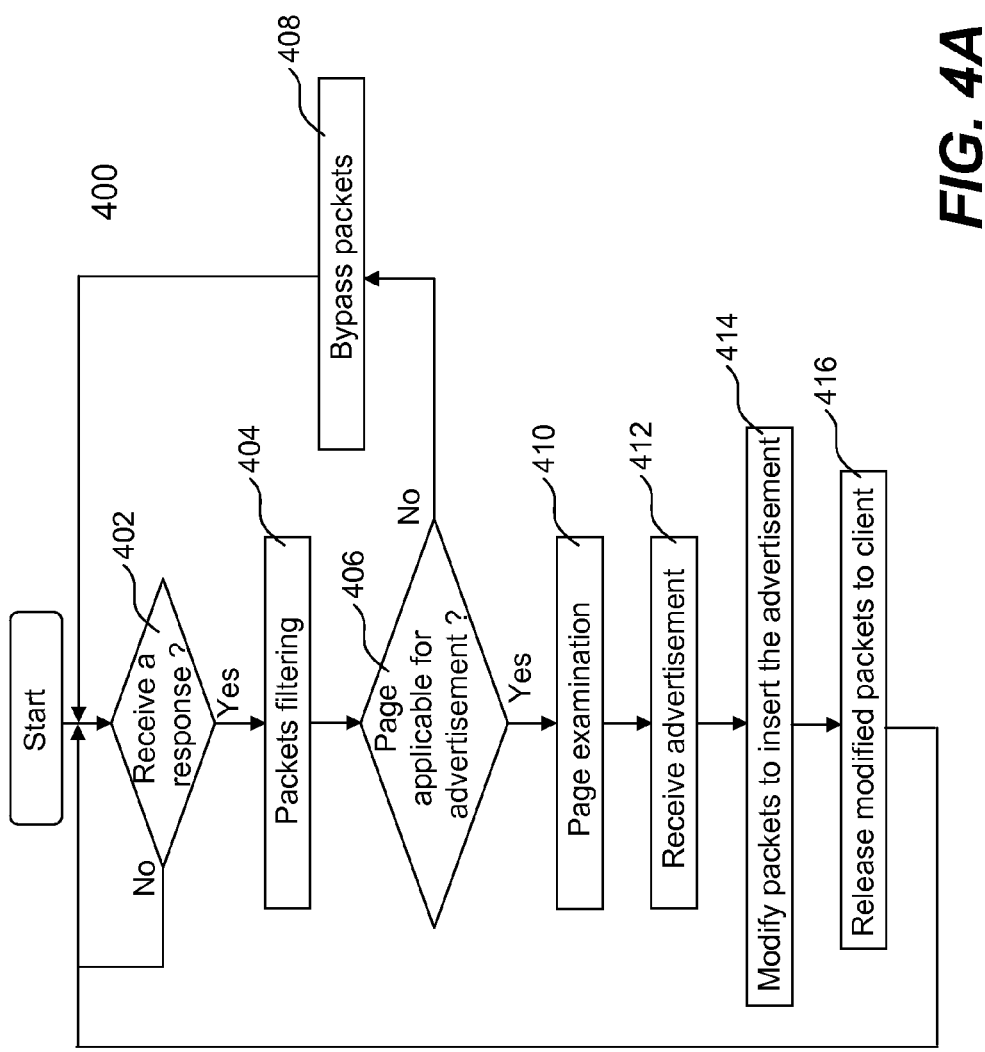
FIG. 4A shows a flowchart or process of placing one or more advertisements in available spaces determined from a webpage requested by a user.

FIG. 4A shows a flowchart or process 400 of placing one or more advertisements in available spaces determined from a webpage requested by a user. The process 400 may be understood in conjunction with preceding figures. Depending on implementation, the process 400 may be implemented in software, hardware or a combination of both software and hardware. According to one embodiment, the process 400 can be advantageously used by a service provider to place targeted advertisements to generate additional revenues without disrupting data traffics in its networks.

The process 400 is initiated at 402 when a requested webpage is being received in responding to a request from a user. It is assumed that the user (e.g., one of the subscribers to the Internet services) has requested to access a particular website by sending out an HTTP request, such a request is intercepted by a device (e.g., the network device 104 of FIG. 1). The request is analyzed to determine or update a browsing behavior (e.g., a behavioral profile) of the user. In one embodiment, the request or metadata thereof is transported to a server (e.g., the server 112 of FIG. 1) that is configured to perform the analysis of the request. The analysis helps to determine an appropriate advertisement that may be of interest to the user.

When a response to the request is intercepted by the device, the data packets representing the response go through a filtering process at 404 that is configured to bypass those responses or packets thereof that are not meant for placing an advertisement therein. For example, a user has requested to download a piece of music. The music data is in general not applicable for placing an advertisement and thus bypassed. At 406, the process 400 determines whether there is an opportunity to place an advertisement in the response. If it is determined that the intercepted response is not applicable for placing an advertisement there, the process 400 goes to 408 where the intercepted response is bypassed and continues its journey to a client machine that originally sends out the request. The process 400 then goes back to 402 to await a next response.

It is assumed that the intercepted response does present an opportunity for an advertisement. For example, the user has requested to access the front page of www.marketwatch.com. The response, namely the front page as shown in FIG. 2D, is represented in HTML. The process 400 then moves from 406 to 410 where it determines where the webpage presents an opportunity to insert or place one or more targeted advertisement therein. In one embodiment, the webpage is analyzed in a network device to determine whether there is an available space in the webpage that may be used to place an advertisement. In another embodiment, the HTML file representing the webpage is analyzed, which may also be performed in conjunction with a browser being used by the user. In still another embodiment, a script is embedded in the webpage. The script is executed in a browser when the webpage is displayed. The script scans the webpage and looks for available spaces over certain sizes. The search results are then sent back to a server that determines appropriate advertisements to be paced in the space. FIG. 2D shows that at least two spaces 250 and 252 meeting certain criteria are located. Depending on implementation, the criteria may be based on a size requirement, a shape, and/or a location requirement. In one embodiment, a background color or surrounding color of a located area is also determined as some advertisements may not fit well in a certain color.

In some cases, whether a space is sufficient for an advertisement is determined by a display resolution or a display ratio. Many layouts of webpages are designed based on a certain resolution. As different displays are set to be in different display resolutions, a located available space in a webpage in one display resolution may not be necessarily an available resolution in the same webpage in another display resolution. In one embodiment, a script embedded in a webpage locates an available space that may be further verified in a server (e.g., the server 300 of FIG. 3) before a decision to place an advertisement therein is made. Further, many layouts of webpages are designed based on a 4:3 display ratio while there are displays in 4:3 ratio, 16:9 ratio and others. When a 4:3 display layout is presented on a 16:9 display, there could be a lot of spaces on both sides of the webpage. FIG. 2D shows that there is an empty bar on the right side of the display. In any case, the objective of 410 is to find available spaces in the intercepted webpage for placement of advertisements that are of interest to the user, provided that the publisher allows such placements of advertisements.

At 412, one or more targeted advertisements are determined. Depending on implementation, the advertisements may be determined based on the browsing behavior of the user and/or the content and context of the webpage. In the case that the browsing behavior dictates, the server is configured to select from a database an appropriate advertisement based on the browsing behavior of the user (that may be constantly updated). For example, the browsing behavior indicates that the user spends a lot of time browsing websites related to cars in the last two days or the past hours, the selected advertisement may be a car advertisement. As a result, the car advertisement is placed in the received webpage, regardless whether the received webpage is related to the cars or not.

In the case that the content or context dictates, the server is configured to select from a database an appropriate advertisement based on the content and/or context of the intercepted webpage. For example, the requested webpage is www.marketwatch.com which may indicate that the user is interested in the security market. Thus the selected advertisement may be something related to the security market (e.g., a brokerage advertisement). As a result, the advertisement placed in the received webpage is closely related to the content or/and context of the received webpage. In one embodiment, scripts including links to the selected advertisements are generated. Examples of such a script may include, but not be limited to, javascript and actionscript.

At 414, the advertisement is placed in the received page. According to one embodiment, a script containing a link to the advertisement is inserted in one or more of the data packets representing the page. When the webpage is displayed on a display of a client device, the script is executed to pull the corresponding advertisement and place the advertisement in the space determined. To insert such a script in the response, appropriate packets are identified and then modified to include the script. As described above, one of the important features in the present invention is to modify such packets without interrupting or altering the original data traffic pattern of the data packet. Accordingly, only the payloads of the identified packets are modified to include the script. If the identified packets do not allow the script to be included (e.g., the packet length would exceed a limit), one or more new packets may be fabricated, resulting in mapping of the packets in the network device.

Figure 4B:
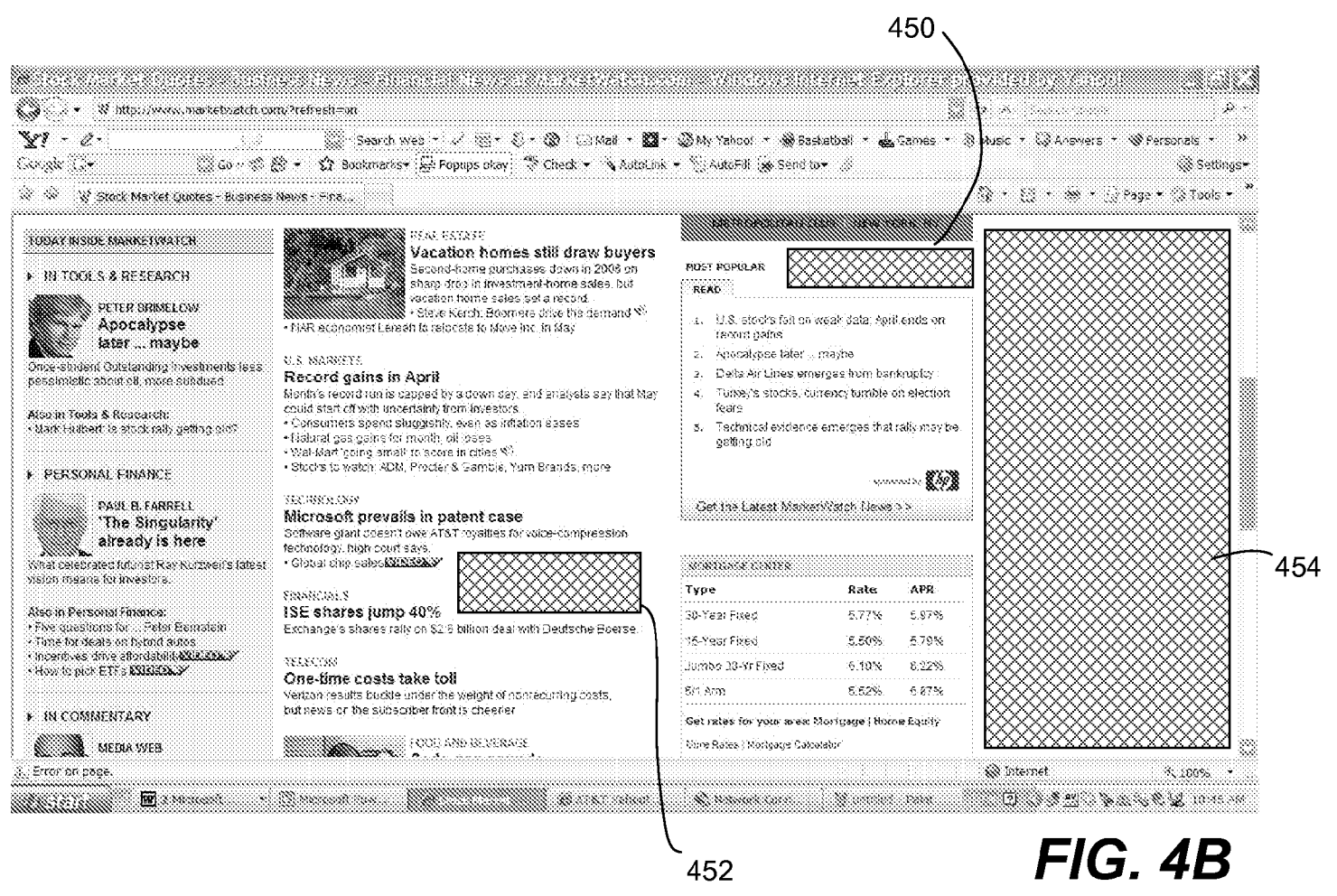

At 416, the modified date packets are released to the client machine that requested the webpage. As the headers of the data packets are nearly intact, the data packets continue their journey to the client machine. Upon receiving the data packets, the client machine (e.g., a browser) activates to display the webpage, resulting in an execution of the embedded script. The client machine is then activated per the script to pull the advertisement from a device (e.g., a server or a database) in accordance with the link in the script. The pulled advertisement is eventually displayed in the located available space of the webpage. Because the advertisement is selected per the interest or browsing behavior of the user, there is a greater chance that the user may tempt to click on the advertisement, resulting in a click-though to a website of the advertiser. FIG. 4B shows that the webpage of FIG. 2D has been placed at least three targeted advertisements 450, 452 and 454, where the advertisements 450 and 453 are placed directly in the webpage while the advertisement 454 is placed in the expanded space as a result of a different display ratio.

Figure 5A:
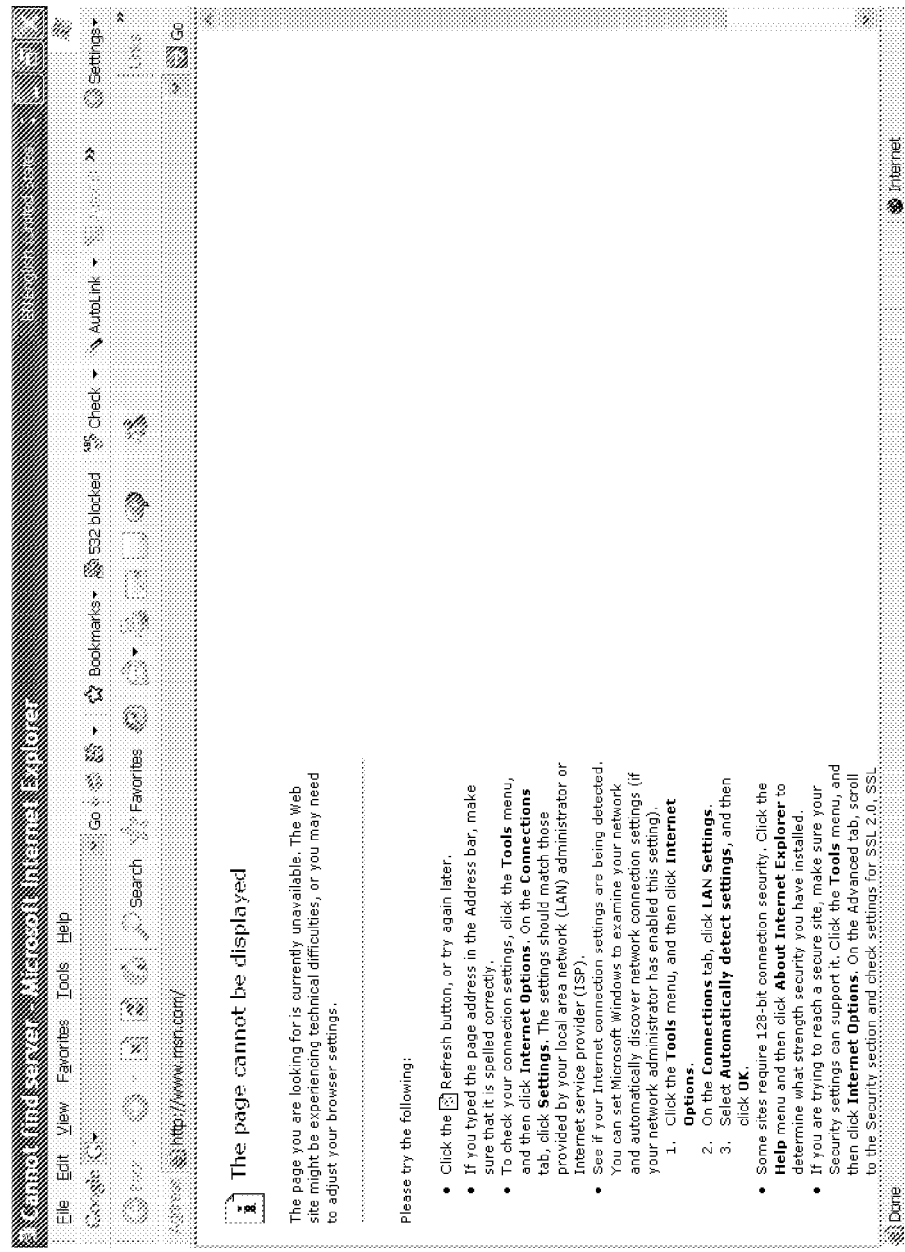
FIG. 5A shows a snapshot of an exemplary error message when a website can not be accessible at the time being requested.

In some cases, a website a user desires to access may be out of function or a network thereto is not working. Regardless of what is exactly happens, a service provider can always receive the first-hand information that something wrong has happened before the user is going to get an error message. An article "Hypertext Transfer Protocol—HTTP/1.1" downloadable from http://www.ietf.org/rfc/rfc2616.txt, which is hereby incorporated by reference, provides a list of failure reasons, each assigned to an error code. FIG. 5A shows a snapshot 500 of an exemplary error message as a result of one of the error codes when a website www.msn.com can not be accessible at the time being requested, telling a user that a request to visit the website has failed. The failure to access the website may be one of many reasons (e.g., the website is brought down for maintenance, a local area network to the website is too congested or in downtime). According to one aspect of the present invention, the first-hand information (i.e., the error code) is used as an opportunity to the service provider to place some targeted advertisements in a default message composed as a webpage (e.g., HTML page).

Figure 5B:
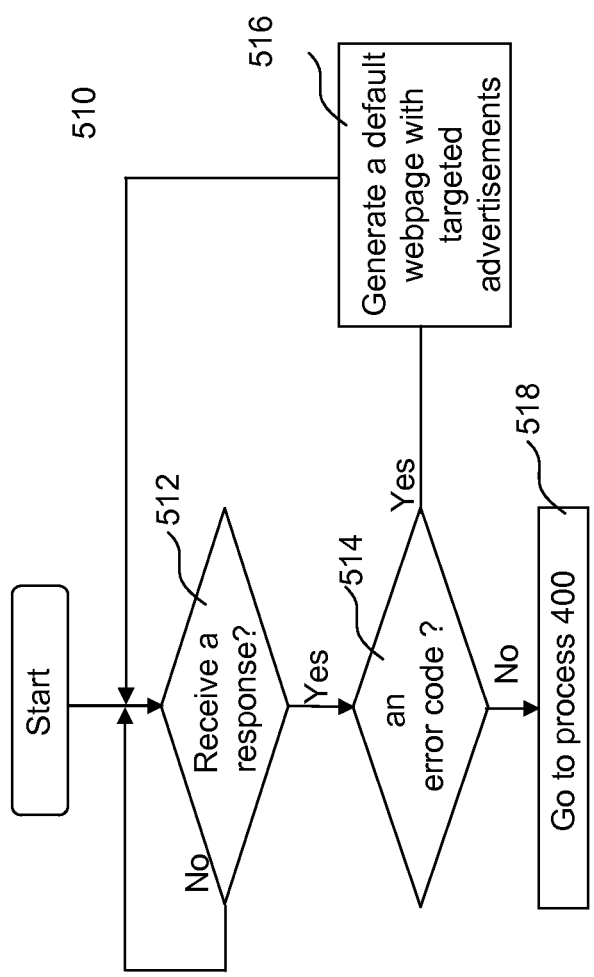
FIG. 5B shows a flowchart or process of placing one or more advertisements in a default page including an error message and inserted targeted advertisements.
Figure 5C:
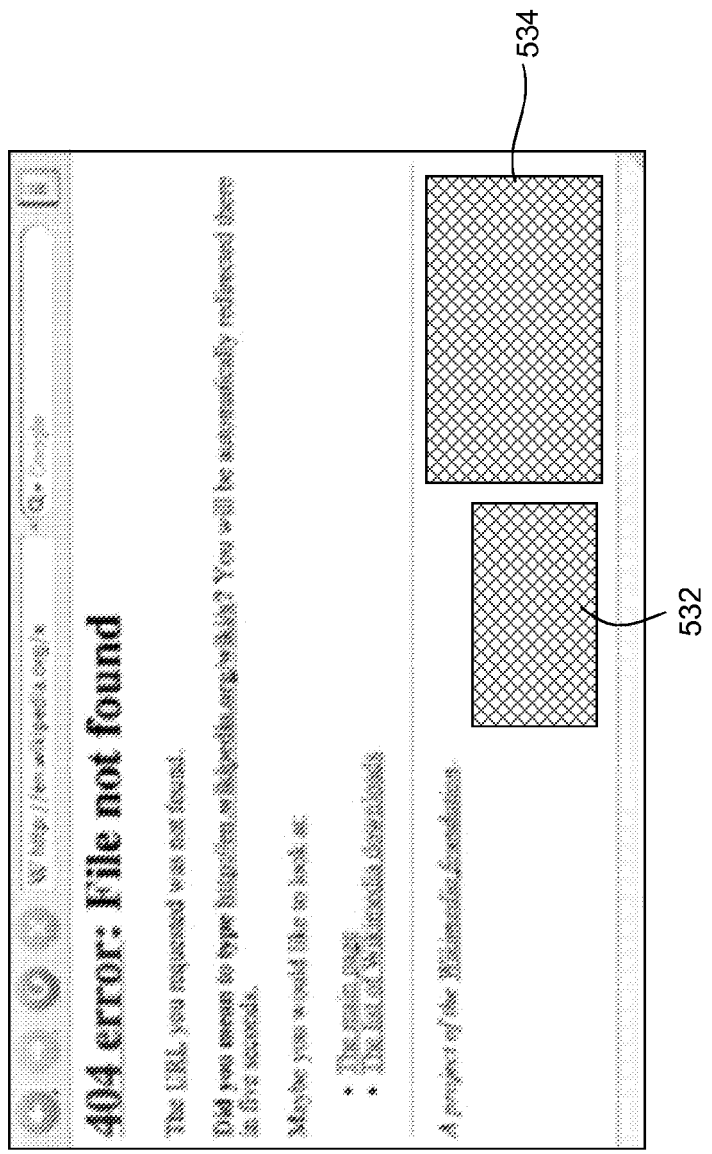
FIG. 5C shows that an exemplary default webpage including an error message and inserted targeted advertisements.

FIG. 5B shows a flowchart or process 510 of placing one or more advertisements in an error message. It is assumed that a client machine is caused to send a request to visit a website. For example, a browser is executed to send an HTTP request including a URI. At 512, the process 510 awaits a response from the website being requested to visit. If no any response is received for some time, the client machine associated with the user may generate an error message or display a webpage similar to the one shown in FIG. 5A. Alternatively, in one embodiment, if a network device (e.g., corresponding to the device 104 of FIG. 1) detects that no any response to the request is received after a predefined time (e.g., 20 seconds), the network device may generate a default page and send the default page to the client machine, wherein the default page may include one or more advertisements or scripts that may be of high interest to the user.

It is assumed that a response to the request is received. The process 510 determines whether the response is a normal response to a request or indicates an error code (which meaning may be defined in the incorporated article). If the response is a standard response (e.g., an HTTP response to an HTTP request), the process may go back to 512 or go 518 that is essentially a beginning of the process 400. On the other end, if the response includes an error code, for example, 404: not found, which means the server has not found anything matching the request no indication is given of whether the condition is temporary or permanent. The process 510 goes to 516 where a default webpage is generated. In one embodiment, the default is in HTML and includes one or more scripts pertaining to the advertisements that are believed to be correlated with the interests of the user. The default page is then sent to the client machine. As explained above, packets representing the default pages may be fabricated to ensure that the packets are destined to the client machine.

One of the important features, advantages and objects in the present invention is an inherent mechanism that can deliver time-sensitive advertisements correlated with the interest of a user. Many webpages include advertisements that may be scheduled or have been embedded therein for a predefined period. As a result, these advertisements may not be served at a time they are supposed to be served. For example, an advertisement from a restaurant is preferably to be served near a meal time or a holiday season. When a webpage carrying such an advertisement is being visited right after a meal time, the chance that a user interacts on the advertisement is lower than otherwise the advertisement would be shown before the meal time.

Figure 6A:
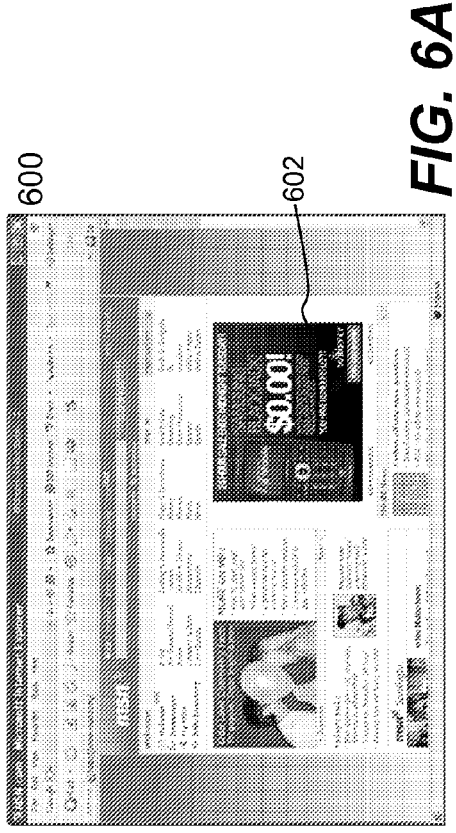
FIG. 6A shows a screen capture of a webpage from a website www.msn.com, where the webpage includes an advertisement.
Figure 6B:
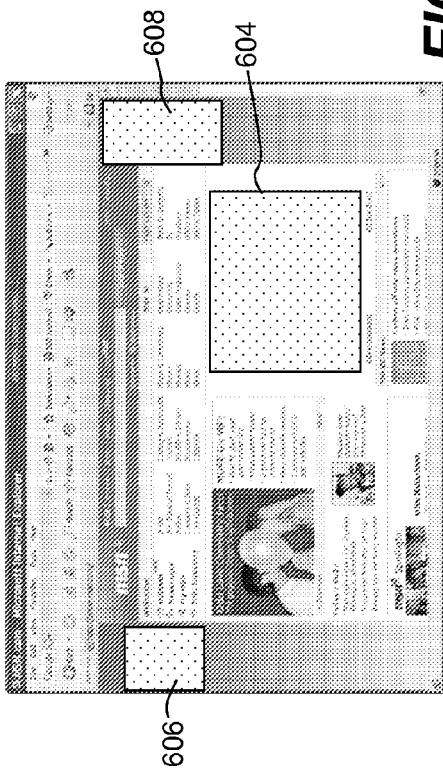
FIG. 6B shows the same screen capture, except that the advertisement originally in FIG. 6A has been replaced by another advertisement that is deemed to be more correlated with the interest of the user.

FIG. 6A shows a screen capture 600 of a webpage from a website www.msn.com. The display shows that the publisher of the website has placed an advertisement 602. In one embodiment of the present invention, the advertisement 602 is replaced with another advertisement 604 without changing the layout of the webpage as shown in FIG. 6B. Depending on application, the advertisement 604 may be more time sensitive than the advertisement 602 and serving the advertisement 604 at a particular time may demand a higher fee than serving the advertisement 602.

Figure 6C:
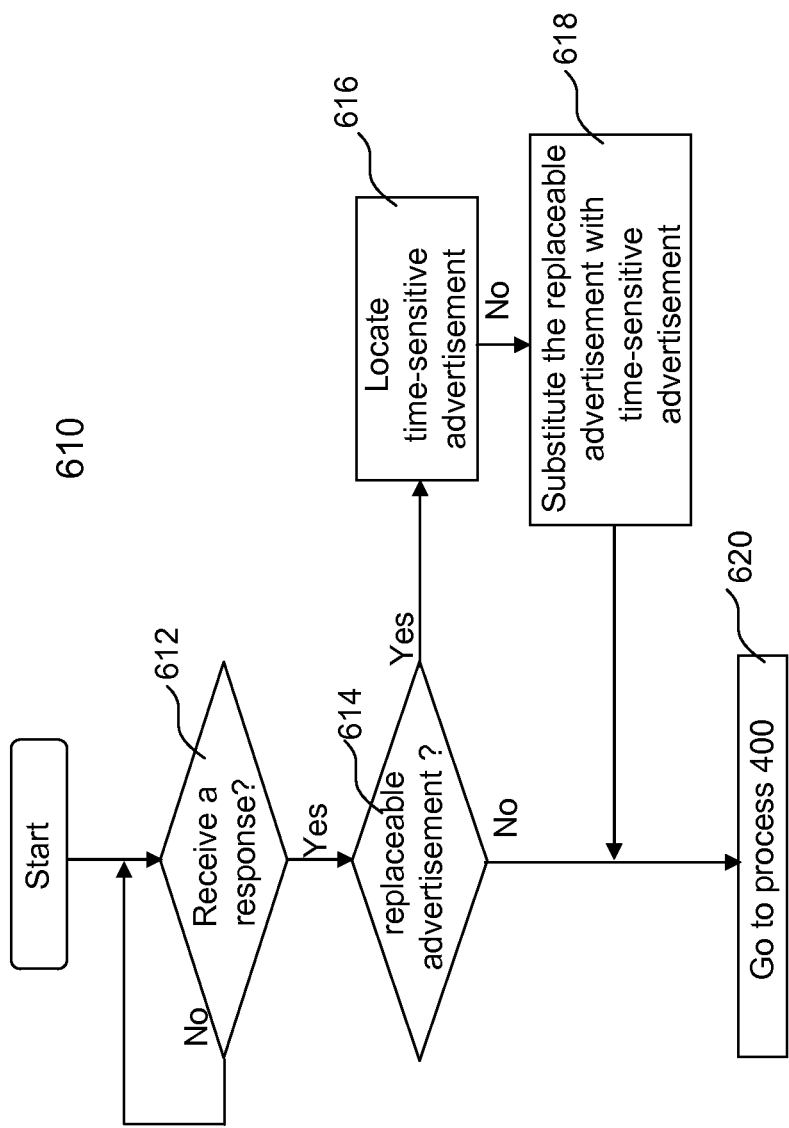
FIG. 6C shows a flowchart or process of substituting an existing advertisement with a preferable advertisement without altering the layout of a webpage.

FIG. 6C shows a flowchart or process 610 of substituting an existing advertisement with a preferable advertisement without altering the layout of a webpage. The process 610 may be initiated when a response to a request is intercepted in a network device (e.g., the device 104 of FIG. 1). It is assumed that the response is a webpage at 612. Thus the process 610 goes to 614 where the network device includes a module, referring to as ad detection module, that is configured to detect whether the webpage includes any advertisements. In one embodiment, the ad detection module looks up for a script that carries one or more links to advertisements. If there is a detection of the presence of such an advertisement or a script thereof, the process 610 determines at 614 whether the advertisement is replaceable. If the advertisement is not replaceable or not to be replaced, the process goes to an end or to 620 that is essentially the beginning of the process 400 of FIG. 4A.

If the decision at 614 is that the advertisement is replaceable or to be replaced, the process 610 goes to 616. Depending on the publisher, as described above, some webpages are not allowed to change while other webpages are allowed to be modified. In some cases, a publisher servers some advertisements in its webpages while the advertisements are provided by various advertisers, an advertising agent or an advertising network (e.g., ValueClick Media) serving various publishers. As used herein, various advertisers, an advertising agent or an advertising network are referred to interchangeably as an advertising agent. The publisher gets a fee whenever its webpages carrying the advertisements are visited or whenever the advertisements therein are interacted by a user.

Nevertheless, the advertisements may or may not be served at a particular time or in conjunction with a particular interest of a user. With the first-hand information about the activities of a user, a service provider is able to negotiate with the advertising agent for a higher fee if a particular advertisement is served at a particular time, in a particular context/content, or in conjunction with a particular behavior. For example, a website being visited carries a cosmetic advertisement. When it is detected that the user appears to be male, the cosmetic advertisement would be far less meaningful to the user. Accordingly, the service provider may be in a position to request something else to be served.

Upon detecting at 614 that an advertisement in the intercepted webpage is replaceable (e.g., the advertisement is provided by an advertising agent), the process 610 goes to 616 where the advertising agent is negotiated to place a preferable advertisement (e.g., more time sensitive) with a higher fee. The preferable advertisement decided at 616 is believed to be correlated with the interest of the user. At 618, the original advertisement in the webpage is replaced by the preferable advertisement. In one embodiment, the script for the original advertisement is either modified or replaced so that the webpage now carries a script including a link to the preferable advertisement. Subsequently, when the request webpage is displayed on a client machine, the webpage is displayed with the preferable advertisement as shown in FIG. 6B as opposed to the original advertisement in FIG. 6A.

The process 610 may return to 612 (not shown). If the process 610 after 618 goes to 620 to enter the process 400, an identified space in the webpage or a presentation of the webpage on a display may be used for placing an advertisement. FIG. 6B shows that a preferable advertisement 604 is placed within the displayed webpage and two targeted advertisements 606 and 608 are placed respectively in located available spaces due to a display resolution or aspect ratio different from that of the original layout of the webpage.

Given the detailed description of various embodiments of the present invention, those skilled in the art may appreciate a new method of generating revenues from serving advertisements online can be realized. First, a service provider (e.g., AT&T or Comcast) traditionally providing legacy services can now generate additional revenues by serving targeted advertisements to its users or subscribers. Second, with the first-hand information about the content/context/activities of its users, a service provider is now in a better position to replace an existing advertisement with something preferable for a different fee structure.

One skilled in the art will recognize that elements of the present invention may be implemented in software, but can be implemented in hardware or a combination of hardware and software. The invention can also be embodied as computer-readable code on a computer-readable medium. The computer-readable medium can be any data-storage device that can store data which can be thereafter be read by a computer system. Examples of the computer-readable medium may include, but not be limited to, read-only memory, random-access memory, CD-ROMs, DVDs, magnetic tape, hard disks, optical data-storage devices, or carrier wave. The computer-readable media can also be distributed over network-coupled computer systems so that the computer-readable code is stored and executed in a distributed fashion.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

We claim:

1. A network computing device deployed in a network for modifying data packets that pass through the network before reaching a terminal device, the network device comprising:
    a processor;
    a data filtering module configured to determine whether a data packet that passes through the network device falls into a predetermined category, the data filtering module passing data packets intact back to the network if the data packet does not fall into the predetermined category;
    a data examiner module configured to receive and examine only data packets that fall into the predetermined category from the data filtering module, the data examiner module configured to determine whether a webpage content replacement opportunity exists in the examined data packets according to predetermined criteria; and
    a packet manager module configured to receive only data packets having webpage content replacement opportunity, and replace an existing webpage content in a received data packet with a predetermined webpage content.

2. The network device of claim 1, wherein the data filtering module is configured to bypass data packets that do not represent a response to a request from a client machine.

3. The network device of claim 1, wherein the data examiner module examines payload of incoming data packets.

4. The network device of claim 1, wherein the packet manager module modifies a payload of the received data packet wherein the payload represents the existing webpage content.

5. The network device of claim 4, wherein headers of the received data packets remain intact.

6. The network device of claim 1, wherein the existing content represents an advertisement.

7. The network device of claim 1, wherein the existing content represents an empty space in a webpage.

8. The network device of claim 1, wherein the existing webpage content represents a script containing a link to another webpage content.

9. The network device of claim 1, wherein the predetermined webpage content represents an advertisement.

10. The network device of claim 1, wherein the predetermined webpage content has a script containing a link to another webpage content.

11. The network device of claim 1, further comprising a bypass controller for bypassing incoming data packets in a predefined event.

12. The network device of claim 1 further comprising an AD manager module for placing an advertisement in a webpage requested by a user.

13. The network device of claim 12, wherein the AD manager module adds a script to the webpage requested by the user, the added script including a link to another advertisement contained in a repository, wherein when the webpage in being displayed, the added script will be executed and cause a retrieval of the another advertisement from the repository.

14. The network device of claim 1 further comprising a metadata manager module for extracting data from received data packets.

15. The network device of claim 14, wherein the metadata manager module extracts address of a website from data packets representing a user request to access the website.

16. A method for modifying data packets in a network, the method comprising:
    filtering data packets that pass through a network device before reaching a terminal device to determine whether any of the data packets falls into a predetermined category;
    passing data packets intact back to the network if the data packets do not fall into the predetermined category;
    examining data packets that belong to the predetermined category to determine whether a webpage content replacement opportunity exists in the examined data packets according to predetermined criteria; and
    replacing an existing webpage content in the examined data packets with a predetermined webpage content.

17. The method of claim 16, wherein the filtering comprises bypassing data packets that do not represent a response to a request from a client machine.

18. The method of claim 16, wherein the examining comprises examining payload of incoming data packets.

19. The method of claim 16, wherein the replacing comprises modifying a payload of the received data packet wherein the payload represents the existing webpage content.

20. The method of claim 19, wherein headers of the received data packets remain intact.

21. The method of claim 16, wherein the existing webpage content represents an advertisement.

22. The method of claim 16, wherein the existing webpage content represents an empty space in a webpage.

23. The method of claim 16, wherein the existing webpage content represents a script containing a link to another webpage content.

24. The method of claim 16, wherein the predetermined content represents an advertisement.

25. The method of claim 16, wherein the predetermined content has a script containing a link to another content.

26. The method of claim 16 further comprising bypassing incoming data packets in a predefined event.

27. The method of claim 16 further comprising placing an advertisement in a webpage requested by a user.

28. The method of claim 27, wherein the placing comprises adding a script to the webpage requested by the user, the added script including a link to another advertisement contained in a repository, wherein when the webpage is being displayed, the script will be executed and cause a retrieval of the another advertisement from the repository.

29. The method of claim 16 further comprising extracting data from received data packets.

30. The method of claim 29, wherein the extracting comprises extracting address of a website from data packets representing a user request to access the website.

* * * * *